US012579881B2

(12) United States Patent
Ovalle

(10) Patent No.: US 12,579,881 B2
(45) Date of Patent: Mar. 17, 2026

(54) COVER DETECTION SYSTEM FOR SPAS

(71) Applicant: Sundance Spas, Inc., Chino, CA (US)

(72) Inventor: Larry R. Ovalle, Glendora, CA (US)

(73) Assignee: Sundance Spas, Inc., Chino, CA (US)

( * ) Notice: Subject to any disclaimer, the term of this patent is extended or adjusted under 35 U.S.C. 154(b) by 230 days.

(21) Appl. No.: 18/323,028

(22) Filed: May 24, 2023

(65) Prior Publication Data

US 2023/0419815 A1 Dec. 28, 2023

Related U.S. Application Data

(60) Provisional application No. 63/498,651, filed on Apr. 27, 2023, provisional application No. 63/371,503, filed on Aug. 15, 2022, provisional application No. 63/365,403, filed on May 26, 2022.

(51) Int. Cl.

*E04H 4/06* (2006.01)
*G08B 21/24* (2006.01)
*E04H 4/08* (2006.01)

(52) U.S. Cl.

CPC .............. *G08B 21/24* (2013.01); *E04H 4/082* (2013.01)

(58) Field of Classification Search

CPC .................... G08B 21/24; E04H 4/082; A61H 2201/5046; A61H 2201/5058; A61H 2201/5097

See application file for complete search history.

(56) References Cited

U.S. PATENT DOCUMENTS 7,412,733 B2 8/2008 Dorsch
7,600,271 B2 10/2009 Piche et al.
7,614,093 B2 11/2009 Piche et al.
7,891,031 B2 2/2011 Khalaf et al.

(Continued)

FOREIGN PATENT DOCUMENTS

EP 2730723 12/2014
EP 3235975 11/2018

(Continued)

OTHER PUBLICATIONS

International Search Report and Written Opinion for Internation Application No. PCT/US2023/023425/ dated Sep. 5, 2023.

(Continued)

*Primary Examiner* — Dominic E Hawkins
(74) *Attorney, Agent, or Firm* — Knobbe, Martens, Olson & Bear, LLP

(57) ABSTRACT

A cover detection system may include a magnet positioned on a first portion of a spa, the first portion being one of a spa cover or a spa shell. The cover detection system may include a sensor positioned on a second portion of the spa, the second portion being the other one of the spa cover or the spa shell, wherein the sensor is configured to detect a position of the first portion relative to the second portion. The cover detection system may include a wireless controller in communication with the sensor, the wireless controller configured to receive information from the sensor indicative of the position, wherein the wireless controller is further configured to provide an indication to a user of whether the position is in a first state, or a second state based at least in part on the information received from the sensor.

20 Claims, 12 Drawing Sheets

(56) References Cited

U.S. PATENT DOCUMENTS

| | | | |
|---|---|---|---|
| 9,284,741 B2 | | 3/2016 | Scheps et al. |
| 10,214,929 B2 | | 2/2019 | Stone, Jr. |
| 10,311,699 B2 | | 6/2019 | Tepper |
| 10,934,729 B2 | * | 3/2021 | Guilfoyle .................. E04H 4/08 |
| 11,060,310 B2 | * | 7/2021 | Greer ................. A61H 33/6005 |
| 11,561,026 B1 | * | 1/2023 | Tandler ................... H02S 40/44 |
| 2008/0311898 A1 | | 12/2008 | Benco et al. |
| 2017/0314281 A1 | * | 11/2017 | Young ....................... B32B 7/09 |
| 2020/0270886 A1 | * | 8/2020 | Guilfoyle ........... A61H 33/6005 |
| 2020/0319621 A1 | | 10/2020 | William et al. |

FOREIGN PATENT DOCUMENTS

| | | |
|---|---|---|
| EP | 3312364 | 11/2018 |
| EP | 3772804 | 2/2021 |
| EP | 3214237 | 7/2021 |
| EP | 4036350 | 8/2022 |
| WO | WO 2007/082091 | 7/2007 |
| WO | WO 2008/040871 | 4/2008 |
| WO | WO 2008/048496 | 4/2008 |
| WO | WO 2019/070836 | 4/2019 |
| WO | WO 2020/176083 | 9/2020 |

OTHER PUBLICATIONS

International Preliminary Report on Patentability amd Written Opinion for International Application No. PCT/US2023/023425 dated Nov. 7, 2024, in 14 pages.

* cited by examiner

COVER DETECTION SYSTEM FOR SPAS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to U.S. Provisional Patent Application No. 63/365,403, filed May 26, 2022, U.S. Provisional Patent Application No. 63/371,503, filed Aug. 15, 2022, and U.S. Provisional Patent Application No. 63/498,651, filed Apr. 27, 2023, all of which are incorporated by reference herein in their entirety.

TECHNICAL FIELD

The present invention relates generally to a cover detection system for spas.

BACKGROUND

Spa cover detection systems can detect whether a spa cover is properly secured to a spa shell and/or detect whether a spa cover has been secured to the spa shell and/or removed from the spa shell. Spa cover detection systems can also provide an indication to users about the status of the spa cover which can results in energy savings and child protection.

SUMMARY

According to some embodiments, a cover detection system for a spa includes a first component positioned on a first portion of the spa, a second component positioned on a second portion of the spa, and a wireless controller in communication with the second component. The first portion of the spa can be one of a spa cover or a spa shell, and the second portion of the spa can be the other one of the spa cover or the spa shell. The second component can be configured to detect a position of the first portion relative to the second portion. The wireless controller can be configured to receive information from the second component indicative of the position. The wireless controller can be configured to provide an indication to a user of whether the position is in a first state, or a second state based at least in part on the information received from the second component. The first component can be a magnet and the second component can be a sensor.

A variation of the aspect above is, wherein the first component is removably positioned on the first portion and the second component is removably positioned on the second portion.

A variation of the aspect above is, wherein the first state is when the spa cover covers an upper end of the spa shell and the second state is when at least a portion of the spa cover is not covering at least a portion of the spa shell.

A variation of the aspect above is, wherein the second component detects the first state when the first component is in proximity with the second component, and wherein the second component detects the second state when the first component is not in proximity with the second component.

A variation of the aspect above is, wherein the indication of the wireless controller includes a visual indication and/or an auditory indication.

A variation of the aspect above is, wherein the wireless controller and the second component communicate via Bluetooth.

A variation of the aspect above is, wherein the wireless controller provides the indication to the user via a remote device.

A variation of the aspect above is, wherein the wireless controller and the remote device communicate via cellular.

A variation of the aspect above is, wherein the wireless controller and the remote device communicate via Wi-Fi.

A variation of the aspect above is, wherein the second component includes a battery to power the second component.

A variation of the aspect above is, wherein the wireless controller is configured to receive information from the second component indicative of a status of the battery and provide an indication to the user of the status of the battery.

A variation of the aspect above is, wherein the status of the battery includes a battery level.

A variation of the aspect above is, wherein the status of the battery includes battery not found.

A variation of the aspect above is, wherein the wireless controller is configured to provide an indication to the user of a status of a connection between the wireless controller and the second component.

A variation of the aspect above is, wherein the status of the connection between the wireless controller and the second component is based at least in part on a distance between the wireless controller and the second component.

According to some embodiments, a cover detection system for a spa includes a sensor mounted to one of a spa cover or a spa shell and configured to detect a condition of the spa cover, a magnet, and a mounting plate. The mounting plate can include a recess configured to receive the magnet and mounted to the other of the spa cover or the spa shell. The condition of the spa cover can include a first state wherein a surface of the sensor and a surface of the mounting plate are not in contact thereby indicating that the spa cover is open. The condition of the spa cover can include a second state wherein the surface of the sensor and the surface of the mounting plate are in contact thereby indicating that the spa cover is closed. The sensor can be mounted to one of the spa cover or the spa shell using adhesive, glue, or screws. The mounting plate can be mounted to the other of the spa cover or the spa shell using adhesive, glue, or screws.

A variation of the aspect above is, wherein the sensor is mounted to a bottom face of the spa cover and the mounting plate is mounted to an upper surface of the spa shell.

A variation of the aspect above is, wherein the sensor is mounted to an upper surface of the spa shell and the mounting plate is mounted to a bottom face of the spa cover.

A variation of the aspect above is, wherein a shape of the recess of the mounting plate and a shape of the magnet are the same.

A variation of the aspect above is, wherein the sensor is mounted to one of the spa cover or the spa shell using screws and the mounting plate is mounted to the other of the spa cover or the spa shell using adhesive.

A variation of the aspect above is, wherein the cover detection system includes a wireless controller in communication with the sensor. The wireless controller can be configured to receive information from the sensor indicative of the condition of the spa cover. The wireless controller can be configured to provide an indication to a user of whether the spa cover is in the first state or the second state.

According to some embodiments, a cover detection system for a spa includes a sensor mounted to a side surface of a spa shell, a magnet, and a clip. The sensor can be configured to detect a condition of a spa cover. The clip can include a recess configured to receive the magnet. The clip can be configured to receive a strap of the spa cover. The condition of the spa cover can include a first state wherein a surface of the sensor and a surface of the mounting plate are not in contact thereby that the strap of the spa cover is not secured to the spa shell. The condition of the spa cover can include a second state wherein the surface of the sensor and the surface of the mounting plate are in contact thereby indicating that the strap of the spa cover is secured to the spa shell.

A variation of the aspect above is, wherein the clip includes a first arm and a second arm. The first and second arms can define an aperture configured to receive the strap of the spa cover.

A variation of the aspect above is, wherein a shape of the recess of the clip and a shape of the magnet are the same.

A variation of the aspect above is, wherein the sensor is mounted to the side surface of the spa shell using adhesive, glue, or screws.

A variation of the aspect above is, wherein the sensor is mounted to the side surface of the spa shell using adhesive.

A variation of the aspect above is, wherein the cover detection system includes a wireless controller in communication with the sensor. The wireless controller can be configured to receive information from the sensor indicative of the condition of the spa cover. The wireless controller can be configured to provide an indication to a user of whether the spa cover is in the first state or the second state.

According to some embodiments, a cover detection system for a spa can include a sensor positioned on a first portion of a first panel of a spa cover, and a first component positioned on a first portion of a second panel of the spa cover. When the first panel and the second panel are in a closed position, the sensor and the first component can be in a first configuration with respect to each other to indicate a first state. When the first panel and the second panel are in a folded position, the sensor and the first component can be in a second configuration with respect to each other to indicate a second state. The first component can include a magnet.

A variation of the aspect above is, wherein the first configuration includes a configuration where the sensor and the magnet are in contact with each other.

A variation of the aspect above is, wherein the first configuration includes a configuration where the sensor and the magnet are in close proximity to each other.

A variation of the aspect above is, wherein the second configuration includes a configuration where the sensor and the magnet are not in contact with each other.

A variation of the aspect above is, wherein the second configuration includes a configuration where the sensor and the magnet are not in close proximity to each other.

A variation of the aspect above is, wherein the cover detection system includes a first bracket and a second bracket. The first bracket can be mounted to one of the first and second panels and the second bracket can be mounted to the other of the first and second panels.

A variation of the aspect above is, wherein the sensor is mounted to one of the first and second brackets using adhesive, glue, or screws, and wherein the magnet is mounted to the other of the first and second brackets using adhesive, glue, or screws.

A variation of the aspect above is, wherein the first panel is positioned inside a first pocket of the spa cover, and wherein the second panel is positioned inside a second pocket of the spa cover.

A variation of the aspect above is, wherein the first and second pockets of the spa cover are sealed using a zipper.

A variation of the aspect above is, wherein the first bracket includes one or more tabs configured to nest the first bracket to a corner of the first panel, and wherein the second bracket includes one or more tabs configured to nest the second bracket to a corner of the second panel.

A variation of the aspect above is, wherein the corner of the first panel and the corner of the second panel abut when the first panel and the second panel are in a closed position.

A variation of the aspect above is, wherein the first and second panels form a fold when the when the first panel and the second panel are in a closed position. The sensor and the magnet can be positioned within the fold when the sensor and the magnet are in the first configuration.

A variation of the aspect above is, wherein the cover detection system includes a wireless controller in communication with the sensor. The wireless controller can be configured to receive information from the sensor indicative of a condition of the spa cover. The wireless controller can be configured to provide an indication to a user of whether the spa cover is in the first state or the second state.

According to some embodiments, a cover detection system for a spa can include a sensor bracket, a sensor, a first magnet, a second magnet, and a magnet holder. The sensor bracket can be mounted to a side of the spa shell. The sensor can be removably attached to the sensor bracket and configured to detect a condition of a spa cover. The magnet holder can include a first recess configured to receive the first magnet, and a second recess configured to receive the second magnet. The magnet holder can be configured to receive a strap of the spa cover. The condition of the spa cover can include a first state wherein a surface of the sensor and the first and second magnets are not in contact thereby indicating that the strap of the spa cover is not secured to the spa shell. The condition of the spa cover can include a second state wherein the surface of the sensor and at least one of the first and second sensors are in contact thereby indicating that the strap of the spa cover is secured to the spa shell.

A variation of the aspect above is, wherein the magnet holder includes a first arm and a second arm. The first and second arms can define an aperture configured to receive the strap of the spa cover.

A variation of the aspect above is, wherein a shape of the first recess of the magnet holder and a shape of the first magnet are the same. A shape of the second recess of the magnet holder and a shape of the second magnet can be the same.

A variation of the aspect above is, wherein the sensor bracket is mounted to the side surface of the spa shell using adhesive, glue, or screws.

A variation of the aspect above is, wherein the sensor bracket is mounted to the side surface of the spa shell using adhesive.

A variation of the aspect above is, wherein the sensor is attached to the sensor bracket using screws.

A variation of the aspect above is, wherein the cover detection system includes a wireless controller in communication with the sensor. The wireless controller can be configured to receive information from the sensor indicative of the condition of the spa cover. The wireless controller can be configured to provide an indication to a user of whether the spa cover is in the first state or the second state.

A variation of the aspect above is, wherein the magnet holder is configured to magnetically secure to the sensor bracket and the sensor.

DETAILED DESCRIPTION

Figure 1:
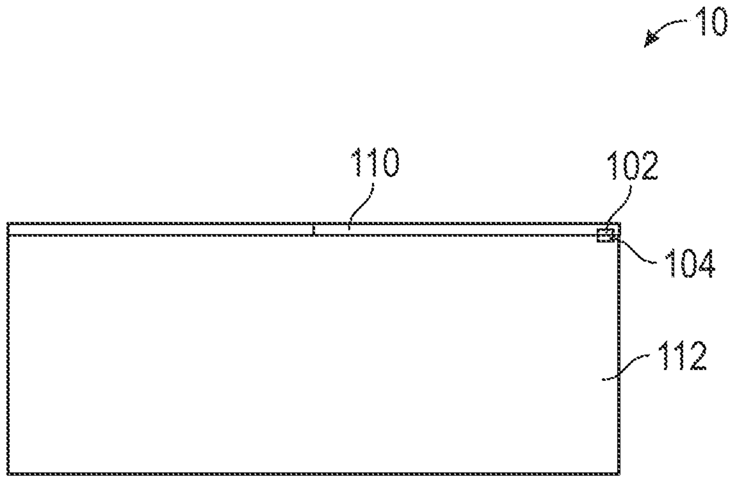
FIG. 1 shows a spa unit with a spa cover and an example of a cover detection sensor.

A spa cover detection system may be desirable for detecting when the spa cover is no longer secured to the spa shell. This can be critical to child safety. The spa cover detection system may also alert the owner the spa cover has blown off on a windy day.

Beneficially, the components of the spa cover detection system described herein can be easily removed or attached to a new or existing spa unit 10. The spa cover detection system can include a first component and a second element. The first component can be mounted to, for example, one of a spa surface or a spa cover, and the second component can be mounted to the other of the spa surface of the spa cover. In some cases, however, the first and second components can be mounted to one or more panels of the spa cover. For instance, the first component can be mounted to a first panel and the second component can be mounted to a second panel. When the first and second elements are in contact with each other or close to each other (e.g., 1 mm, 2 mm, 3 mm, 4 mm, 5 mm, 10 mm, 20 mm etc., apart from each other), one of the first and second components can detect the presence of the other. This can beneficially provide an indication about the status of the spa cover (e.g., whether its closed or open, properly closed, etc.) In any of the illustrated embodiments herein, the first component can include a sensor and the second component can include a magnet. In some cases, the first component can include a magnet and the second component can include a sensor.

In some cases, the first component can include a light emitter and the second component can include a light sensor. The light sensor can detect the presence and/or intensity of the light emitted by the light emitter when the light emitter and the light sensor are in contact with each other or close to each other. This can beneficially provide an indication that the spa cover is closed or properly secured to the spa shell. When the light emitter and the light sensor are separated from each other, such as when the panel one of the light emitter or the light sensor are attached to is not closed and/or properly secured to the spa shell, the light sensor may not detect the light emitted by the light emitter. This can provide an indication that the spa cover is not closed and/or not properly secured to the spa shell.

In some cases, the light sensor can provide an indication that the spa cover is closed and/or properly secured to the spa shell when the light sensor does not detect light (e.g., when the light sensor abuts a surface of the spa shell thus not allowing any light into the light sensor. The light sensor can provide an indication that the spa cover is not closed and/or properly secured to the spa shell when the light sensor detects light.

In some embodiments, the first and second components of the spa cover detection system can comprise a magnet 102 and a sensor 104. The sensor 104 can be a Bluetooth or Bluetooth Low Energy (BLE) sensor. The sensor 104 can be configured to detect the proximity of the nearby magnet 102. The sensor 104 can include a battery configured to power the sensor 104.

The magnet 102 and the sensor 104 can be positioned on the spa unit 10 including, but not limited to, a spa cover or a spa shell. In some embodiments, the magnet 102 can be positioned on the spa cover 110 while the sensor 104 is positioned on the spa shell 112. In other embodiments, the magnet 102 can be positioned on the spa shell 112 while the sensor 104 is positioned on the spa cover 110. The magnet 102 and/or the sensor 104 can be positioned on different portions of the spa cover 110 and/or spa shell 112. For example, and without limitation, the magnet 102 and/or the sensor 104 can be positioned along portions of the spa cover 110 and the spa shell 112 facing or adjacent to each other. The component of the spa cover detection system on the spa shell 112 can be externally attached to the spa shell 112 or integrated into the spa shell 112, for example in or within an acrylic surface of the spa shell 112.

In embodiments where the magnet 102 is positioned on the spa cover 110 and the sensor 104 is positioned on the spa shell 112, the magnet 102 and sensor 104 can be positioned so that the magnet 102 and the sensor 104 are in proximity or in contact with each other when the spa cover 110 is covering the spa shell 112, thereby allowing the sensor 104 to detect the proximity of the magnet 102. In embodiments where the sensor 104 is positioned on the spa cover 110 and the magnet 102 is positioned on the spa shell 112, the sensor 104 and the magnet 102 can be positioned so that the magnet 102 and the sensor 104 are in proximity or in contact with each other when the spa cover 110 is covering the spa, thereby allowing the sensor 104 to detect the proximity of the magnet 102.

Figure 2:
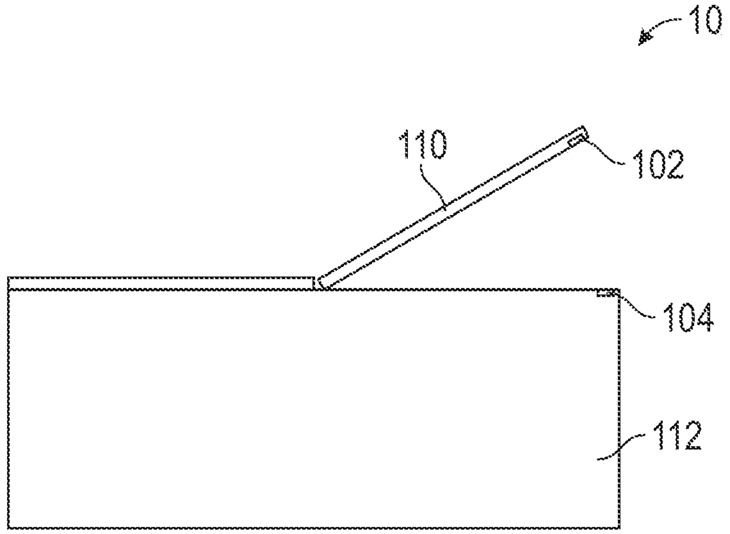
FIG. 2 shows a spa unit with an open spa cover and an example of a cover detection sensor
Figure 3:
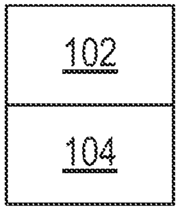
FIG. 3 shows a schematic representation of a cover detection sensor with a magnet and a sensor in contact with each other.
Figure 4:
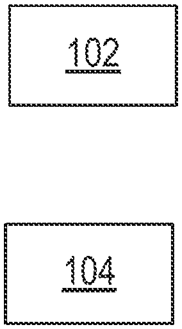
FIG. 4 shows a schematic representation of a cover detection sensor with a magnet and a sensor not in contact with each other.

In some embodiments, the sensor 104 can be configured to detect one or more states of the spa unit 10 including at least a first state and a second state. The first state can be a state in which the spa cover 110 is covering an upper end of the spa shell 112, as that shown in FIG. 1. The second state can be a state in which at least a portion of the spa cover 110 is not covering at least a portion of the upper end of the spa shell 112, as that shown in FIG. 2. The sensor 104 can detect the first state of the spa unit 10 when, for example, at least a portion of the magnet 102 is in proximity or in contact with at least a portion of the sensor 104, as shown in FIGS. 1 and 3. That is, when the sensor 104 detects the proximity of the magnet 102. On the other hand, the sensor 104 can detect the second state of the spa unit 10 when the magnet 102 and the sensor 104 are not in proximity or in contact with each other, as shown in FIGS. 2 and 4. This may occur, for example, when at least the portion of the spa cover 110 having the magnet 102 and/or the sensor 104 is not covering at least a portion of the spa shell 112. That is, when the sensor 104 does not detect the proximity of the magnet 102.

Figure 5:
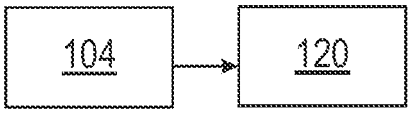
FIG. 5 is a schematic representation of a cover detection sensor in communication with a wireless controller.

The spa cover detection system can also include a wireless controller 120 onboard or in communication with the spa unit 10. The wireless controller 120 can be configured to communicate with the sensor 104, as represented in FIG. 5. The wireless controller 120 can also communicate with a remote device (e.g., a cellphone, tablet, smart watch) via cellular, Wi-Fi, or other wireless communication. For example, the wireless controller 120 can include a Bluetooth transceiver for communicating with the sensor 104 and/or remote device. In some embodiments, the wireless controller 120 may include a cellular transceiver for communicating with the remote device and the cellular transceiver may have Bluetooth capabilities. In some embodiments, the remote device may be able to push updates to the wireless controller 120 enabling the wireless controller 120 to communicate with the sensor 104. Additional details on connectivity between the wireless controller 120 and the remote device can be found in U.S. Publication No. 2021/0283010, which is incorporated by reference in its entirety as if fully set forth herein.

The wireless controller 120 can be connected to the remote device via Bluetooth pairing. For example, the user can pair the remote device with the wireless controller 120 by accessing the settings menu, activating the Bluetooth connection, and selecting the device corresponding to the spa unit 10 disclosed herein. In some embodiments, the remote device can receive information from the wireless controller 120 regarding the one or more states of the spa unit 10. For example, the wireless controller 120 can send information to the remote device indicating that the spa unit 10 is in the first state (e.g., the spa cover 110 is open) as shown in FIG. 1, the second state (e.g., the spa cover 110 is closed), and/or whether the spa unit 10 has transitioned from the first state to the second state or vice versa (e.g., whether the spa cover 110 has been closed or opened).

In some cases, the wireless controller 120 can send information to the remote device pertaining to the status of the battery on the sensor 104. For example, the wireless controller 120 can send information to the remote device indicative of the battery level. Beneficially, this can allow a user to replace the battery of the sensor 104 before the battery level runs out. In some cases, the wireless controller 120 can send information to the remote device regarding the status of the connection between the sensor 104 and the wireless controller 120. The status of the connection between the sensor 104 and the wireless controller 120 can be based at least in part on the distance between the wireless controller 120 and the sensor 104.

Based at least in part on the information received from the sensor 104, the wireless controller 120 can be configured to provide an indication to a user of the status of the spa unit 10 and/or the sensor 104. In some embodiments, a remote or onboard device can comprise a screen configured to provide a visual indication of the status of the spa unit 10 and/or the sensor 104. For example, the screen can be configured to display a message indicating whether the spa unit 10 is in the first state or second state, and/or whether the spa unit 10 has transitioned from the first to the second state or vice versa. The display can also be configured to display a message indicating the status of the connection between the wireless controller 120 and the sensor 104, and/or the status of the battery of the sensor 104.

In some cases, the display can be configured to display a color bar indicative of the status of the spa unit 10 and/or the sensor 104. For example, the color bar can comprise a first color when the sensor 104 detects that the spa unit 10 is in the first state, a second color when the sensor 104 detects that the spa unit 10 is in the second state, and/or a third color when the wireless controller 120 loses connection to the sensor 104. The wireless controller 120 may lose connection with the sensor 104, for example, if the sensor 104 runs out of battery and/or the distance between the wireless controller 120 and the sensor 104 exceeds a predefined threshold. Moreover, the color bar can include one or more lights. The color bar can be configured to display more lights when the sensor 104 and the wireless controller 120 are closer to each other than when the wireless controller 120 and the sensor 104 are farther from each other. In some cases, the remote or onboard device can include a speaker configured to provide an auditory alert indicative of the status of the spa unit 10 and/or the sensor 104. Beneficially, the indications provided to the user by the wireless controller 120 can allow the user to monitor the status of the spa unit 10 remotely. For example, a user can be alerted that the spa cover 110 has been lifted and/or is not properly secured, even if the user is not near the spa unit 10 and/or is not observing the spa unit 10.

Figure 6A:
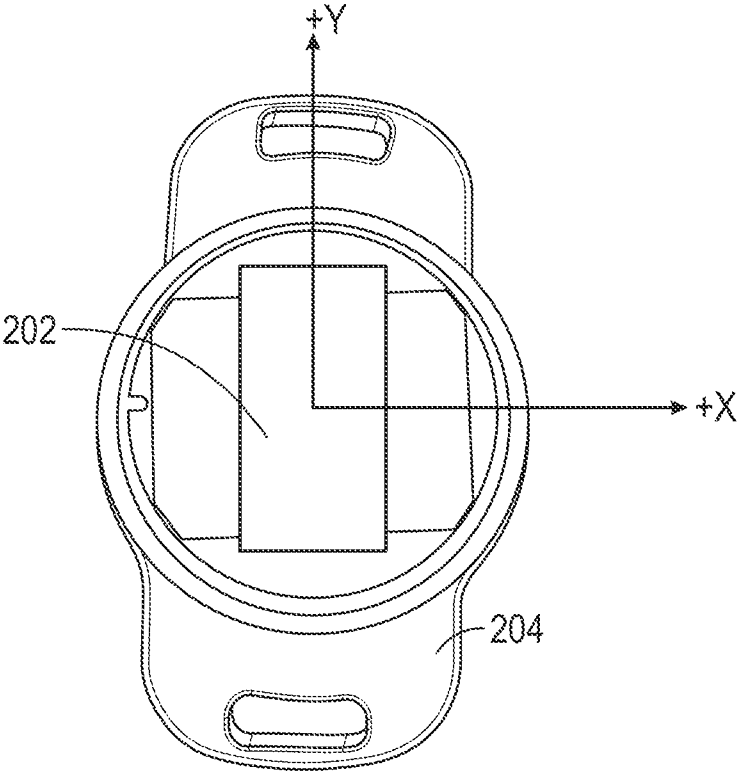
FIG. 6A shows an example of a cover detection sensor with a magnet and a sensor in contact with each other.
Figure 6B:
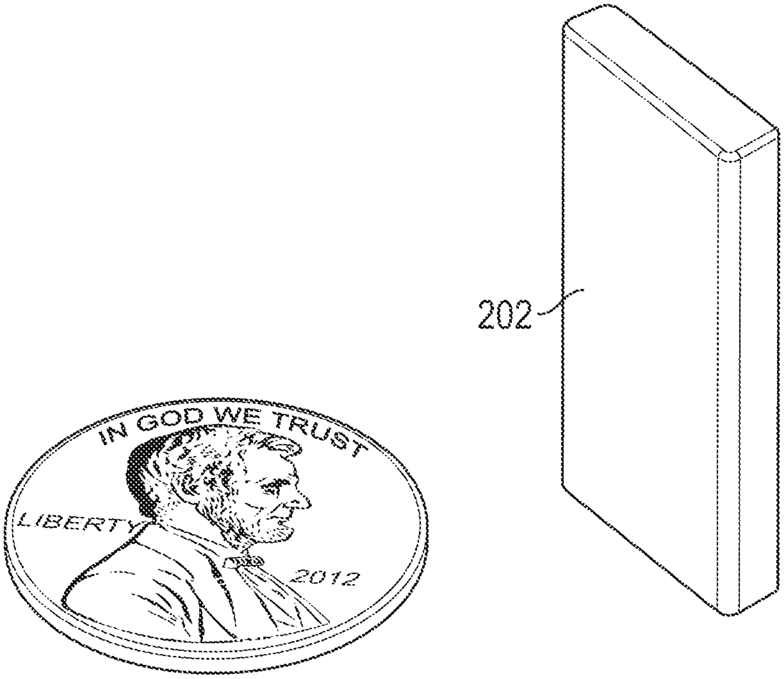
FIG. 6B shows an example of a magnet for a cover detection sensor.

FIGS. 6A and 6B show an example of spa cover detection system including a magnet 202 and a sensor 204. In some cases, the sensor 204 can include a circular shaped region. The shape and size of the magnet 202 can be adjusted so that the magnet 202 aligns with the circular shaped region of the sensor 204. Although FIGS. 6A-6B show a magnet 202 having a rectangular shape, the magnet 202 can have any shape or size that allow it to align with the circular shaped region of the sensor 204. In some cases, the magnet can measure ½"×⅛"×1". Proper alignment between the magnet 202 and the sensor 204 when the spa cover 310 is closed can beneficially improve the sensor's ability and accuracy at detecting the magnet 202. In some cases, the sensor 204 can detect the magnet 202 when the magnet is within a detection range of or about −1¼" and 3" along a first axis X (as shown in FIG. 6A), −¼" and ¼" along a second axis Y (as shown in FIG. 6A), and 0" to 1½" along a third axis Z (not shown). In some cases, the alignment ranges can be different than those described above. The magnet 202 can include a grade N42 neodymium (NdFeB) magnet with a nickel (Ni—Cu—Ni) coating. The magnetization direction of the magnet 202 can be through its thickness. The magnet 202 can have a pull force of about 5.41 lbs. Beneficially, this may prevent the magnet 202 from losing contact with the sensor 204. In some cases, the magnet 202 can have a maximum operating temperature of about 176° F. The maximum operating temperature of the magnet 202 can prevent the magnet from malfunctioning when any heating components of a spa unit are activated.

Figure 7A:
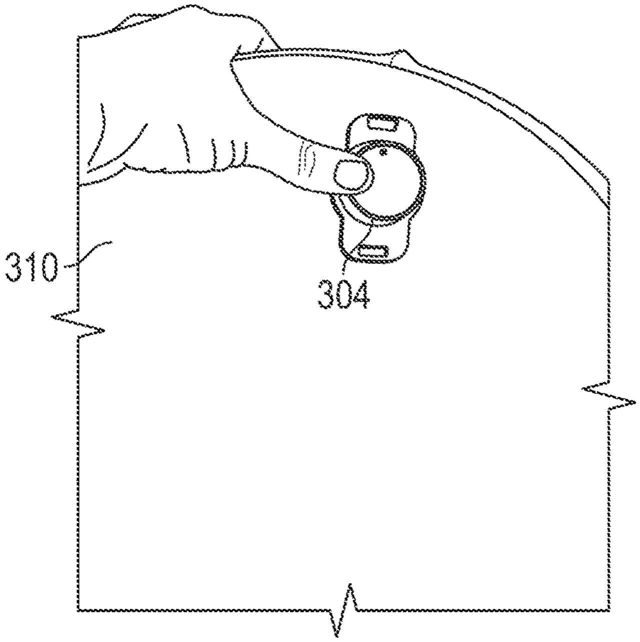
FIGS. 7A-7D show an example of a cover detection sensor in a spa unit.
Figure 7B:
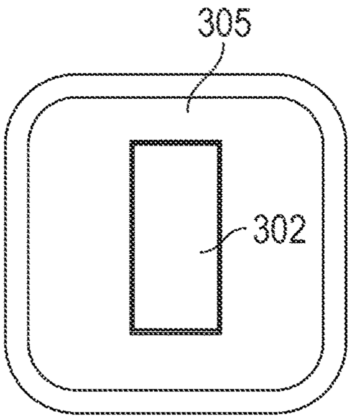
Figure 7C:
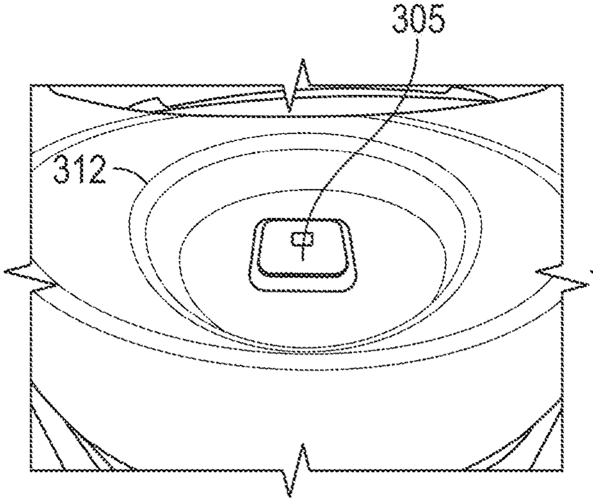
Figure 7D:
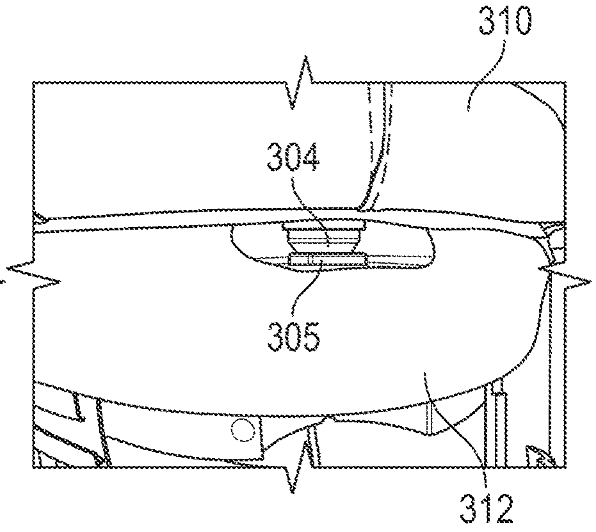

In some cases, the sensor 304 can be mounted to a spa facing surface of a spa cover 310, as shown in FIG. 7A. The sensor 304 can be screwed, glued, or otherwise fixed to the spa facing surface of the spa cover 310. The magnet 302 can be mounted to a mounting plate 305, as shown in FIG. 7B. The mounting plate 305 can include a recess for mounting the magnet 302 to the mounting plate 305. The recess of the mounting plate 305 can correspond to the shape and size of the magnet 302. In some cases, the mounting plate 305 can be positioned on the spa shell 312, for example in a recess of the spa shell 312, as shown in FIG. 7C. The recess of the spa shell 312 can include a speaker recess. The mounting plate 305 can include a self-adhesive surface to facilitate temporary or permanent mounting of the mounting plate 305 to the spa shell 312. As shown in FIG. 7D, the mounting plate 305 and the sensor 304 can be aligned so that a surface of the mounting plate 305 and a surface of the sensor 304 are in contact when the spa cover 310 is in the second state (e.g., when the spa cover 310 is closed). Proper alignment of the sensor 304 and the mounting plate 305 can improve the ability of the sensor 304 to detect when the spa cover 310 is in the first state (e.g., open) or the second position (e.g., closed).

In some cases, the position of the sensor 304 and the mounting plate 305 can be reversed. That is, the sensor 304 can be positioned on a recess of the spa shell 312 and the mounting plate 305 can be mounted to a spa facing surface of the spa cover 310. Although FIGS. 7A-7D show the magnet 302, the sensor 304, and the mounting plate 305 as external components of the spa shell 312 and the spa cover 310, the magnet 302, the sensor 304, and the mounting plate 305 can be integral with the spa cover 310 or the spa shell 312.

Figure 8A:
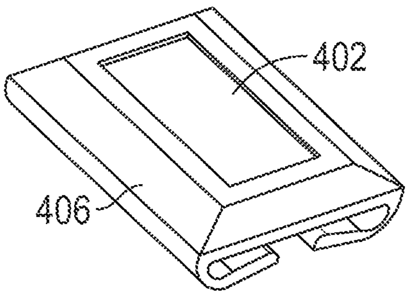
FIGS. 8A-8D show an example of a cover detection sensor in a spa unit.
Figure 8B:
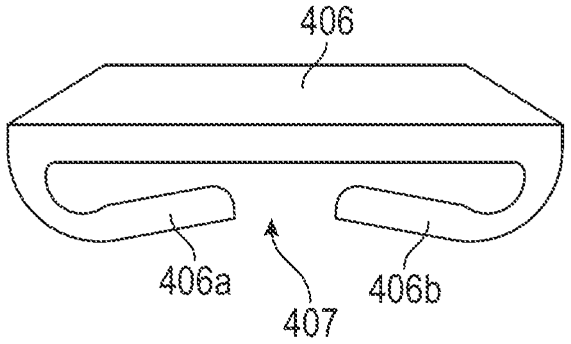
Figure 8C:
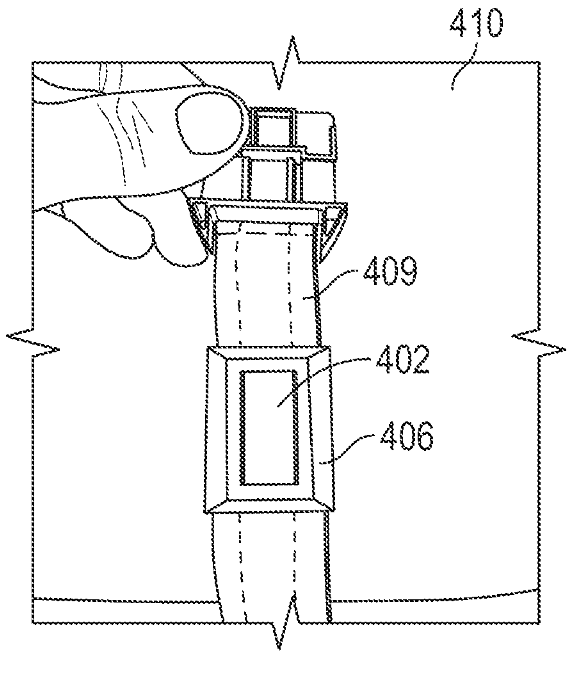
Figure 8D:
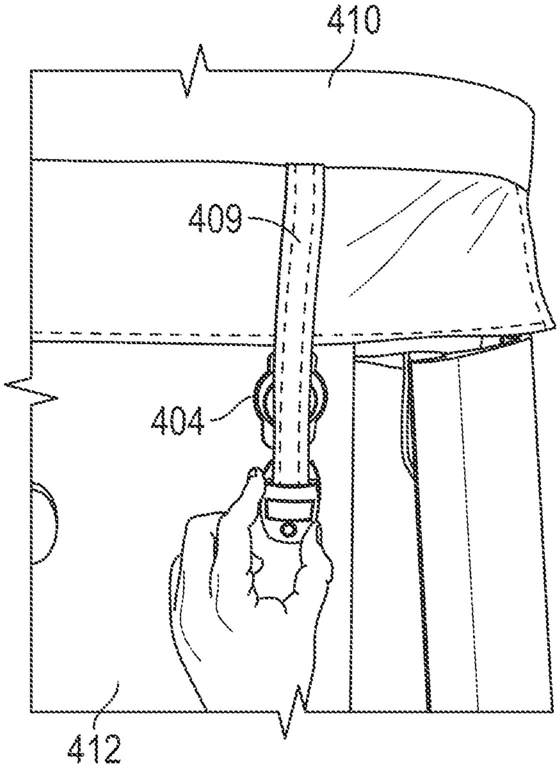

In some cases, the sensor 404 can be mounted to an exterior surface of the spa shell 412, as shown in FIG. 8D. The sensor 404 can be screwed, glued, or otherwise fixed to the exterior surface of the spa shell 412, for example a side surface of the spa shell 412. In some cases, the sensor 404 can include a self-adhesive surface to facilitate temporary or permanent mounting of the sensor 404 to the spa shell 412. The magnet 402 can be mounted to a clip 406, as shown in FIG. 8A. The clip 406 can include a recess for mounting the magnet 403 to the clip 406. The recess of the clip 406 can correspond to the shape and size of the magnet 402. In some cases, the clip 406 can include a pair of arms 406*a*, 406*b* defining an aperture 407. The aperture 407 can receive at least a portion of a securing strap 409 of the spa cover 410 thereby allowing the clip 406 to be attached to the securing strap 409, as shown in FIG. 8C. When the clip 406 is attached to the strap 409, the magnet 402 can face the spa shell 412. The securing strap 409 can include a buckle that can secure the securing strap 409 to the spa shell 412. As shown in FIG. 8D, the clip 406 and the sensor 404 can be aligned so that a surface of the magnet 402 and a surface of the sensor 404 are in contact when the securing strap 409 of the spa cover 410 is secured to the spa shell 412. Proper alignment of the sensor 404 and the clip 406 can improve the ability of the sensor 404 to detect when the spa cover 410 is in the first state (e.g., open) or the second state (e.g., closed).

In some cases, the position of the sensor 404 and the clip 406 can be reversed. That is, the sensor 404 can be attached to the securing strap 409 and the clip 406 can be mounted to an exterior surface of the spa shell 412. Although FIGS. 8A-8D show the magnet 402, the sensor 404, and the clip 406 as external components of the spa shell 412 and the spa cover 410, the magnet 402, the sensor 404, and the clip 406 can be integral with the spa cover 410 or the spa shell 412.

Figure 9A:
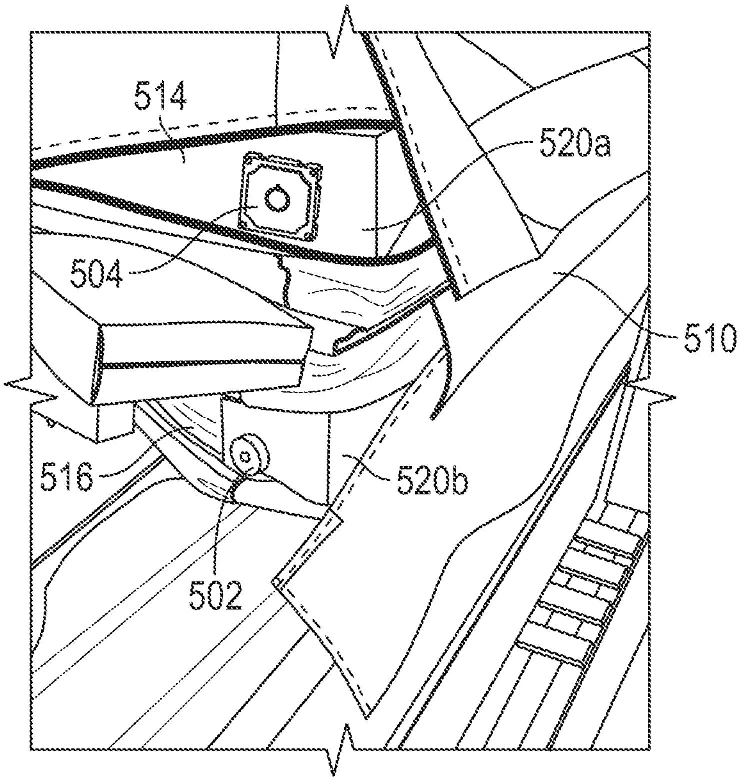
FIGS. 9A-9D show an example of a cover detection system for a spa unit.
Figure 9B:
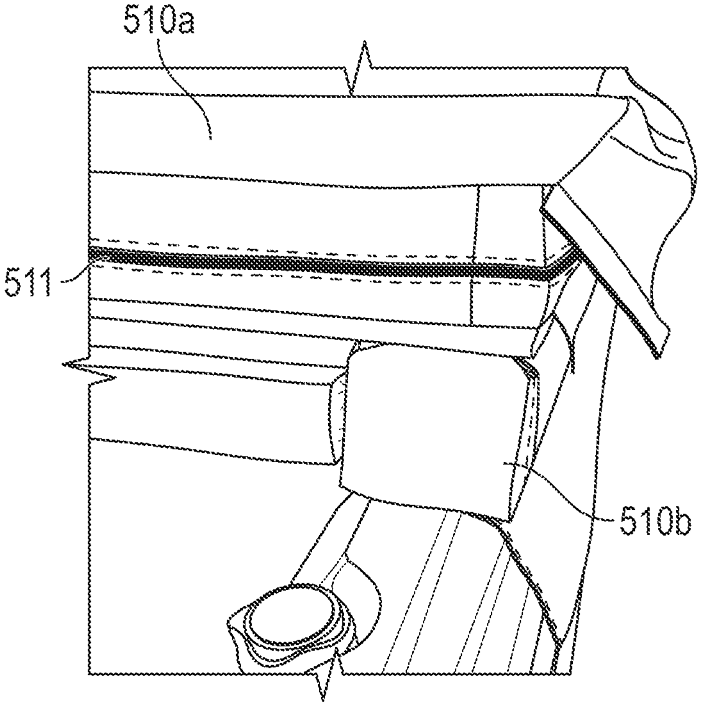

In some embodiments, the sensor and the magnet of the spa cover detection system can be positioned inside the spa cover. For example, the sensor 504 and the magnet 502 can be mounted to spa brackets, as show in FIGS. 9A and 9B. The spa brackets can be attached/secured to a panel of the spa cover 510. In some embodiments, the brackets can nest in the corner of a panel. The sensor 504 can be attached to a first bracket 520*a* and the magnet 502 can be attached to a second bracket 520*b*. In some embodiments, the first and second brackets 520*a*, 520*b* can be made of stainless steel. The brackets 520*a*, 520*b*, in some cases, can be made of any material including, for example, plastic. The sensor 504 can be removably coupled to one of the first bracket 520*a* and the second bracket 520*b* and the magnet 502 can be removably coupled to the other of the first bracket 520*a* and the second bracket 520*b* through the use of, for example, screws, fasteners and/or snap fittings. This can beneficially allow for convenient and easy battery replacement for the sensor 504. The brackets 520*a*, 520*b* can, in some cases, include a snap fit design which can beneficially allow coupling and uncoupling of the sensor 504 and/or the magnet 502 from the brackets 520*a*, 520*b*, without the need of screws, adhesive, etc.

The first and second brackets 520*a*, 520*b* can be secured to two or more panels of the spa cover 510 so that the sensor 504 and the magnet 502 are aligned when the spa cover 510 is in a closed position. For example, the first bracket 520*a* can be secured to a first panel 514 and the second bracket 520*b* can be secured to a second panel 516. The first and second brackets 520*a*, 520*b*, the sensor 504, and the magnet 502 can be sealed inside the spa cover 510. For example, a zipper 511 can facilitate sealing of the spa cover 510. This can beneficially protect the sensor 504 and the magnet 502 from water, moisture, etc., when the sensor 504 and the magnet 502 are placed inside the spa cover 510.

Figure 9C:
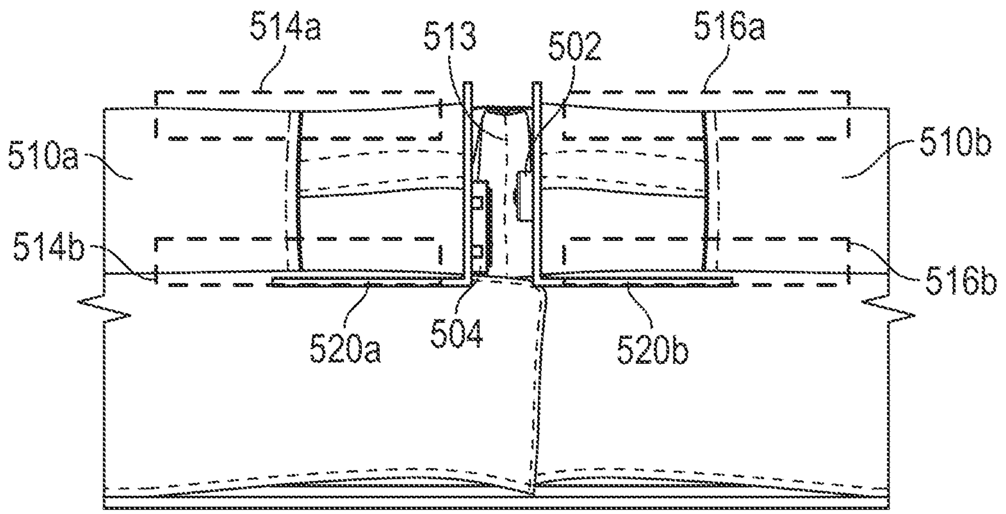
Figure 9D:
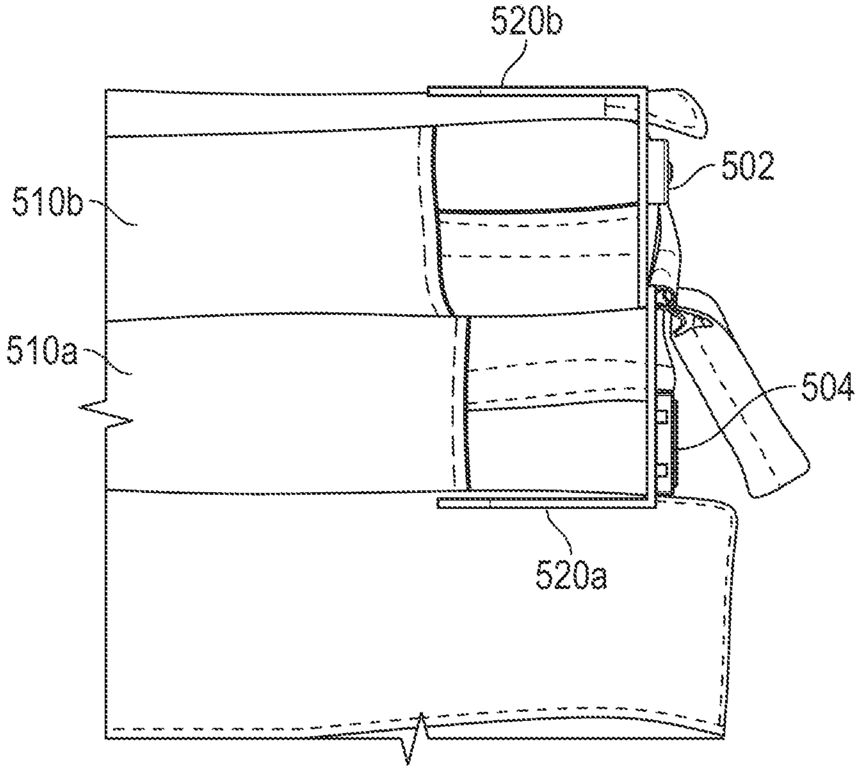

FIGS. 9C and 9D schematically show a location of the sensor 504 and the magnet 502 inside the spa cover 510. In some cases, the sensor 504 and the first bracket 520*a* can be positioned inside a first pocket 510*a* of the spa cover 510, and the magnet 502 and the second bracket 520*b* can be positioned inside a second pocket 510*b* of the spa cover 510. The sensor 504 and the magnet 502 can be positioned on abutting edges of the spa cover 510 and/or the panels 514, 516 of the spa cover.

The first and second panels 514, 516 can form a fold 513 when the spa cover 510 is in a closed position. The sensor 504 and the magnet 502 can be positioned within the fold 513 when the spa cover 510 is closed. When the spa cover 510 is in a first, covered or closed, position, the sensor 504 and the magnet 502 can be positioned between opposing adjacent surfaces of the panels 514, 516. This can beneficially allow the sensor 504 and the magnet 502 to align with each other when the spa cover 510 is in the closed position, as shown in FIG. 9C. When the spa cover 510 is in a second, uncovered or open, position, the sensor 504 and the magnet 502 can be positioned on exposed ends of the panels 514, 516. When the spa cover 510 is in the open position, as shown in FIG. 9D, the magnet 504 and the sensor 502 are not aligned. Alignment of the sensor 504 and the magnet 502 can provide an indication that the spa cover 510 is in the closed position. The sensor can provide an indication that the spa cover 510 is in the open position and/or not properly closed when the sensor 504 and the magnet 502 are not aligned, in contact with each other, and/or in close proximity to each other (e.g., 1 mm, 2 mm, 3 mm, 4 mm, 5 mm, 10 mm, 20 mm etc., apart from each other).

The sensor 504 and the magnet 502 can be positioned anywhere on the first and second panels 514, 516 and/or the spa cover 510. For example, the sensor 504 and the magnet can be positioned on an exterior surface of the first and second pockets 510*a*, 510*b*. In some cases, the sensor 504 and the magnet 502 can be positioned on a face of the first and second panels 514, 516 opposite a spa facing face of the first and second panels 514, 516. For example, the sensor 504 can be secured to a face 514*a* of the first panel 514 opposite a spa facing face 514*b* of the first panel 514*b*. In some cases, the magnet 502 can be secured to a face 516*a* of the second panel 516 opposite a spa facing face 516*b* of the second panel 516. The sensor 504 and the magnet 502 can be in contact with each other/and or in close proximity to each other when the spa cover 510 is in the folded position. In this arrangement, alignment of the sensor 504 and the magnet 502 can provide an indication that the spa cover 510 is in the open position and/or not properly closed. The sensor 504 can provide an indication that the spa cover 510 is in the close position when the sensor 504 and the magnet 502 are aligned, in contact with each other, and/or in close proximity to each other (e.g., 1 mm, 2 mm, 3 mm, 4 mm, 5 mm, 10 mm, 20 mm etc., apart from each other).

Figure 10A:
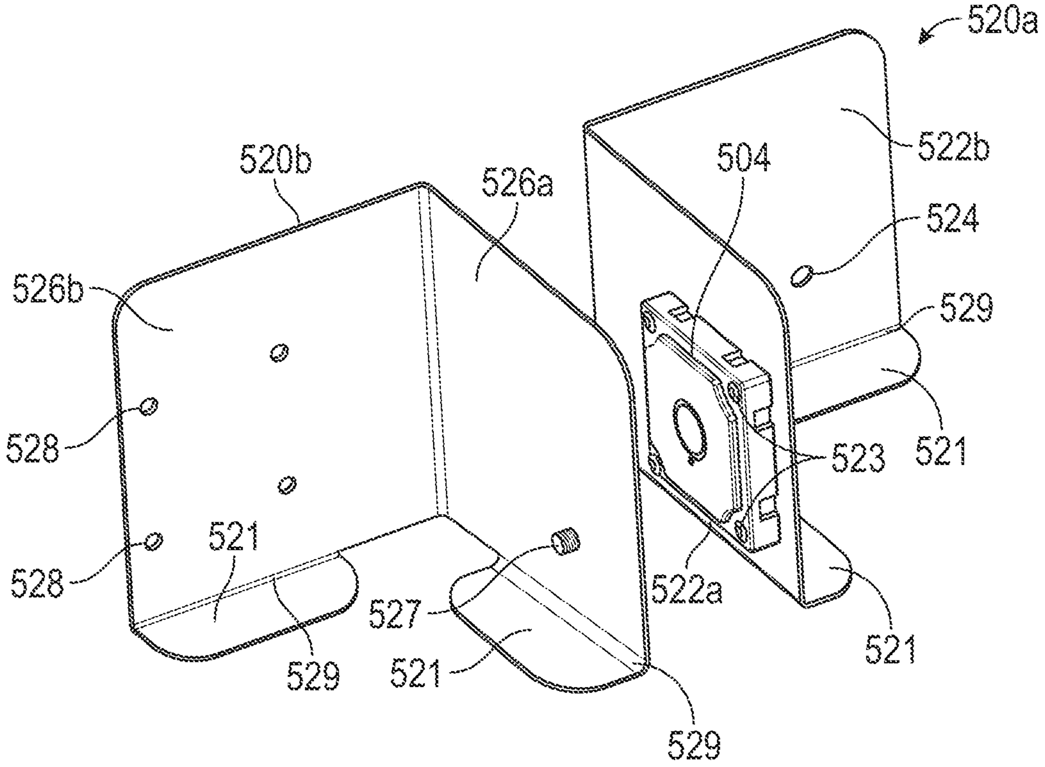
FIGS. 10A-10B show examples of the brackets, sensor, and magnet for the cover detection system shown in FIGS. 9A-9D.

In some embodiments, the brackets can include one or more tabs. For example, each of the first and second brackets 520*a*, 520*b* can include one or more tabs 521 (see FIGS. 10A-C). The tabs 521 can beneficially form corners 529 that can prevent the first and second brackets 520*a*, 520*b* from moving within the spa cover 510 and/or along an edge of the spa cover panel (e.g., 514, 516) that they are secured to and facilitate nesting of the first and second brackets 520*a*, 520*b* to a corner of the spa cover panels 514, 516.

Figure 10B:
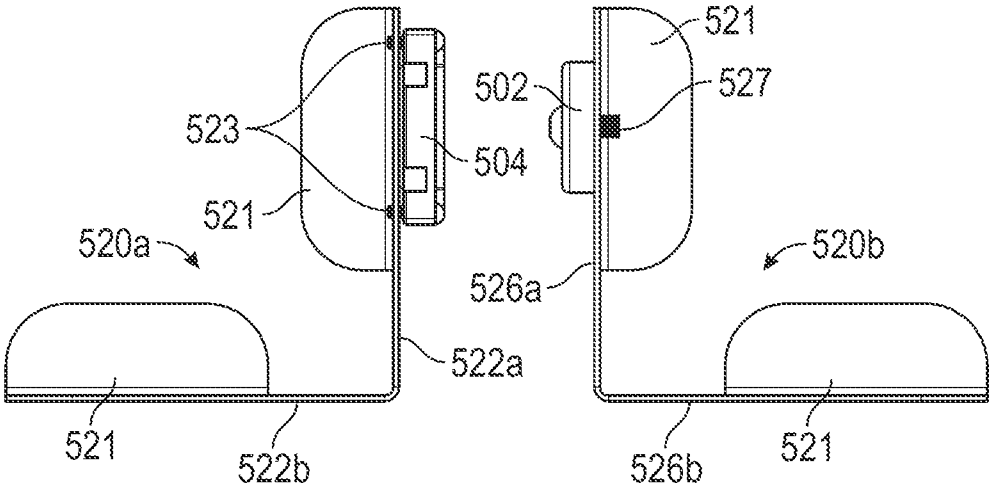

The brackets 520*a*, 520*b* can include one or more holes. For example, a first support structure 522*a* of the first bracket 520*a* can include a plurality of holes (not shown). The plurality of holes in the first support structure 522*a* can beneficially facilitate attachment of the sensor 504 to the first bracket 520*a*. In some embodiments, the plurality of holes along the first support structure 522*a* can receive one or more screws 523. The screws 523 and one or more nuts can be used to secure the sensor 504 to the first support structure 522*a* of the first bracket 520*a*. As shown in FIG. 10C, the sensor 504 can include a plurality of holes 504*a* which can receive the screws 523. In some embodiments, the first bracket 520*a* can receive and secure the sensor 504 and/or the magnet 504. For example, a second support structure 522*b* of the first bracket 520*a* can include one or more holes 524. The holes 524 along the second support structure 522*b* can allow the first bracket 520*a* to receive and secure the magnet 502. In some embodiments, the sensor 504 can include an iBS05 sensor. The sensor 504 can include an ingress protection (IP) rating of at least 5. This can beneficially protect the sensor 504 and allow proper operation of the same even in the presence of liquids (e.g., water), moist, etc.

The second bracket 520*b* can similarly include one or more holes along the support structures of the second bracket 520*b*. For example, a first support structure 526*a* of the second bracket 520*b* can include at least one hole (not shown). The at least one hole in the first support structure 526*a* can beneficially facilitate attachment of the magnet 502 to the second bracket 520*b*. In some embodiments, the at least one hole along the first support structure 526*a* can receive at least one screw 527. The screw 527 and one or more nuts can be used to secure the magnet 502 to the first support structure 526*a* of the second bracket 520*b*.

In some embodiments, the second bracket 520*b* can receive the sensor 504 and/or the magnet 504. For example, a second support structure 526*b* of the second bracket 520*b* can include one or more holes 528. The holes 528 along the second support structure 526*b* can allow the second bracket 520*b* to receive and secure the sensor 504. The ability of the first and second brackets 520*a*, 520*b* to receive both the sensor 504 and the magnet 502 can beneficially allow users to secure the sensor 504 to one of the first and second brackets 520*a*, 520*b* and the magnet 502 to the other. As shown in FIG. 10B, the sensor 504 can be secured to the first support structure 522*a* of the first bracket 520*a* and the magnet 502 can be secured to the first support structure 526*a* of the second bracket 520*b*. This can allow the sensor 504 and the magnet 502 to align with other when the spa cover 510 is in the closed position. Beneficially, alignment of the sensor 504 with the magnet 502 can indicate that the spa cover is in the closed position.

Figure 10D:
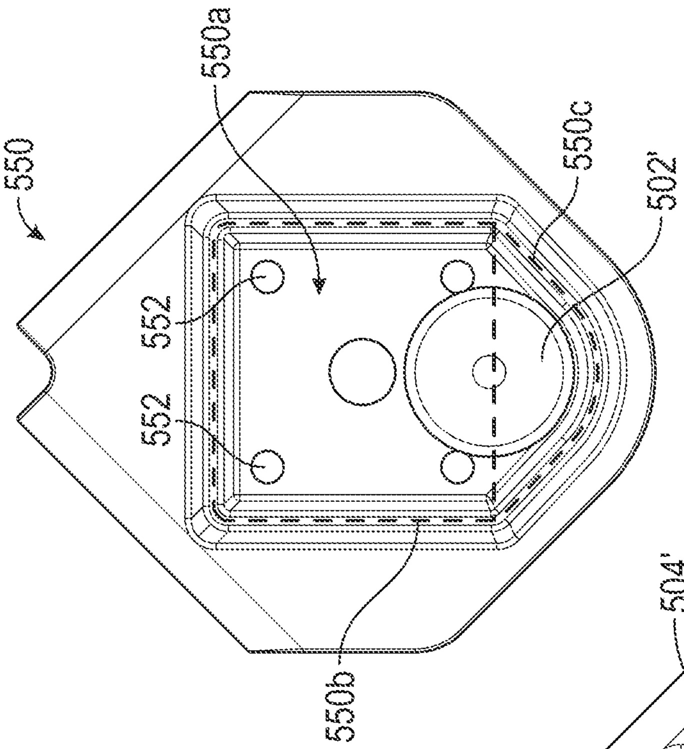
FIGS. 10D and 10E show example holders for a cover detection system.
Figure 10E:
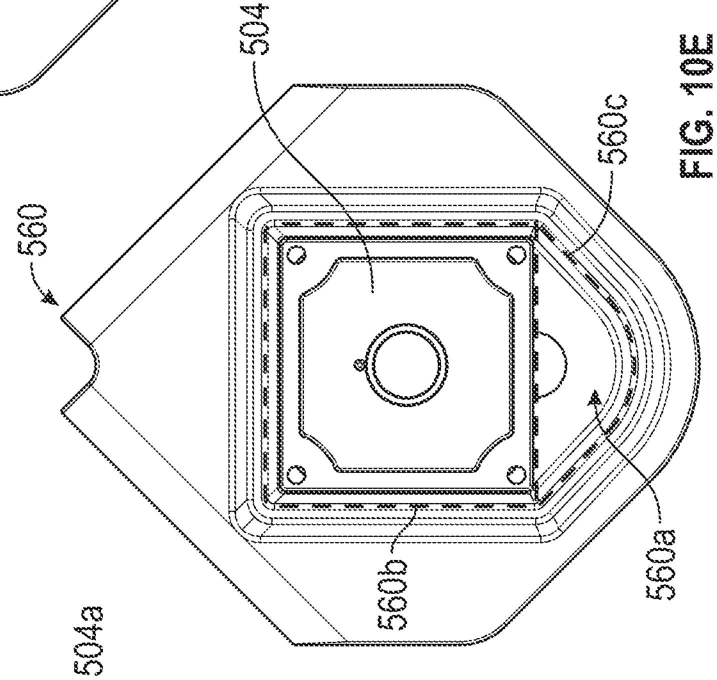
Figure 10C:
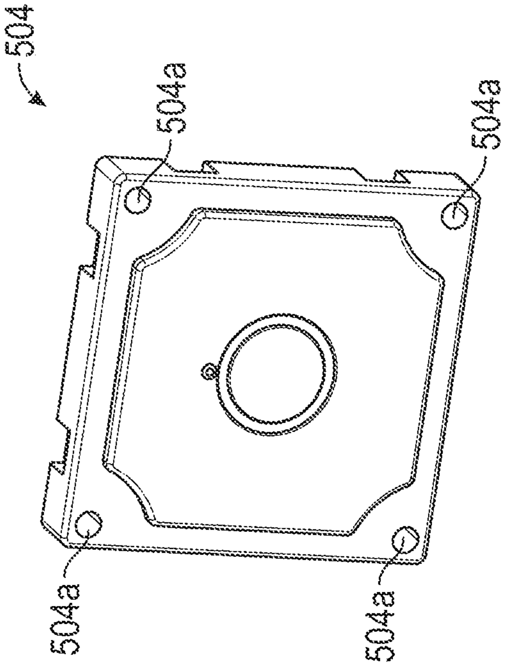
FIG. 10C shows an example of the sensor for the cover detection system shown in FIGS. 9A-9D.

FIGS. 10D and 10E show embodiments of a first holder 550 and a second holder 560 for securing sensors and/or magnets. The first holder 550 and the second holder 560 can receive and secure at least one of a sensor and a magnet. For example, as shown in FIG. 10D, a magnet 502', which can be similar or identical to the magnet 502, can be secured within a recess 550*a* of the first holder 550. A sensor 504', which can be similar or identical to the sensor 504, can be positioned within a recess 560*a*, of the second holder 560. The recesses 550*a* and 560*a* on the first and second holders 550 and 560 can include one or more portions at least partially corresponding to the shape and/or size of the magnet 502' and/or the sensor 504'. For example, a first portion 550*b*, 560*b* can include a shape and/or a size corresponding to the shape and/or size of the sensor 504'. A second portion 550*c*, 560*c* of the first and second holders 550, 560 can include a shape and/or a size corresponding to the shape and/or size of the magnet 502'. The shape and size of the recesses 550*a*, 550*b* can beneficially allow the first and second holders 550, 560 to receive any one of the magnet 502' and/or the sensor 504'.

The first and second holders 550, 560 can include a plurality of holes. The plurality of holes 552 in the first and second holders 550, 560 can beneficially facilitate attachment of the first and second holders 550, 560 to the first and second brackets 520*a*, 520*b*. In some cases, the plurality of holes 522 along the first and second holders 550, 560 can receive one or more screws. The screws and one or more nuts can be used to secure the first and second holders 550, 560 to the first and second brackets 520*a*, 520*b*. In some cases, the first and second holders 550, 560 can be attached directly to the first panel 514 and/or the second panel 516 inside the spa cover 510.

Figure 11A:
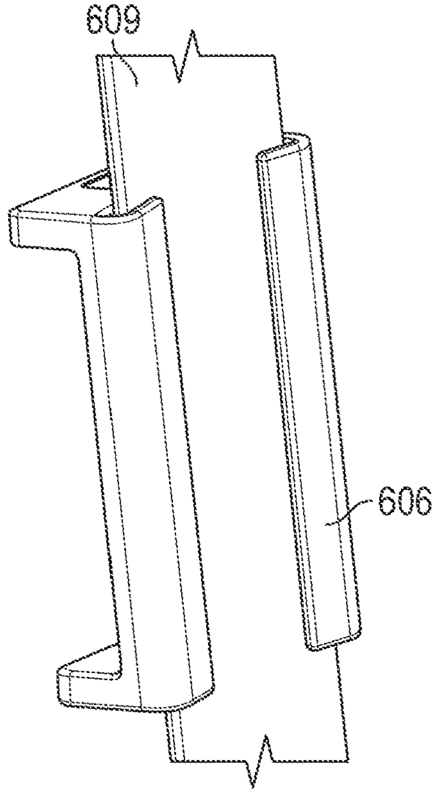
FIGS. 11A-11D show an example of a cover detection system for a spa unit.
Figure 11B:
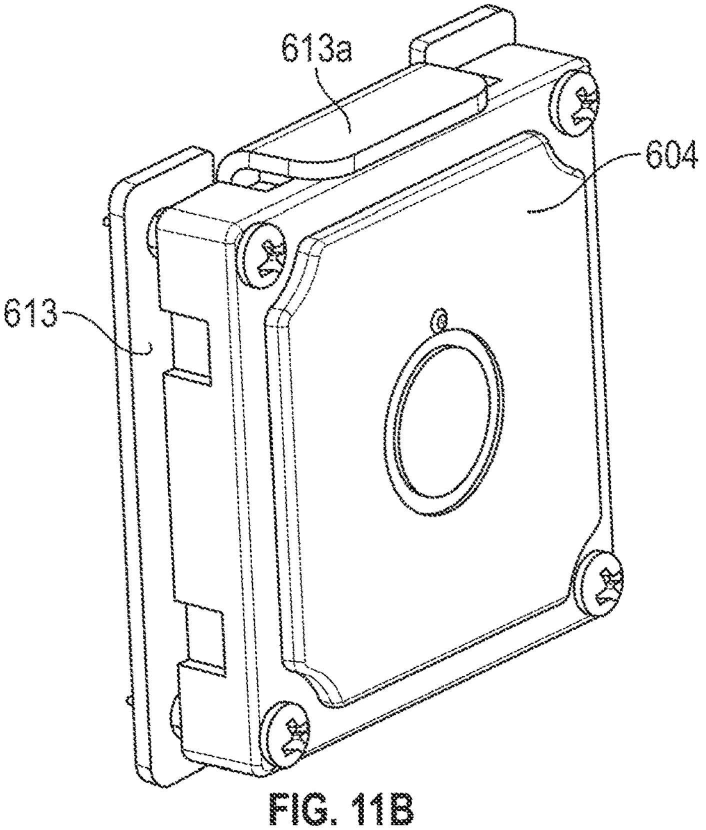
Figure 11C:
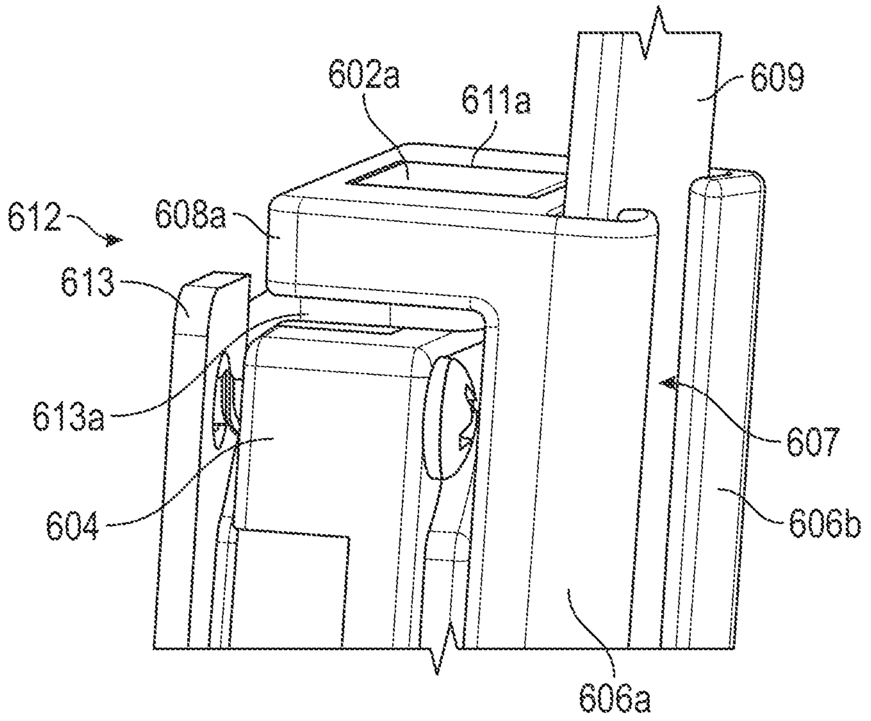
Figure 11D:
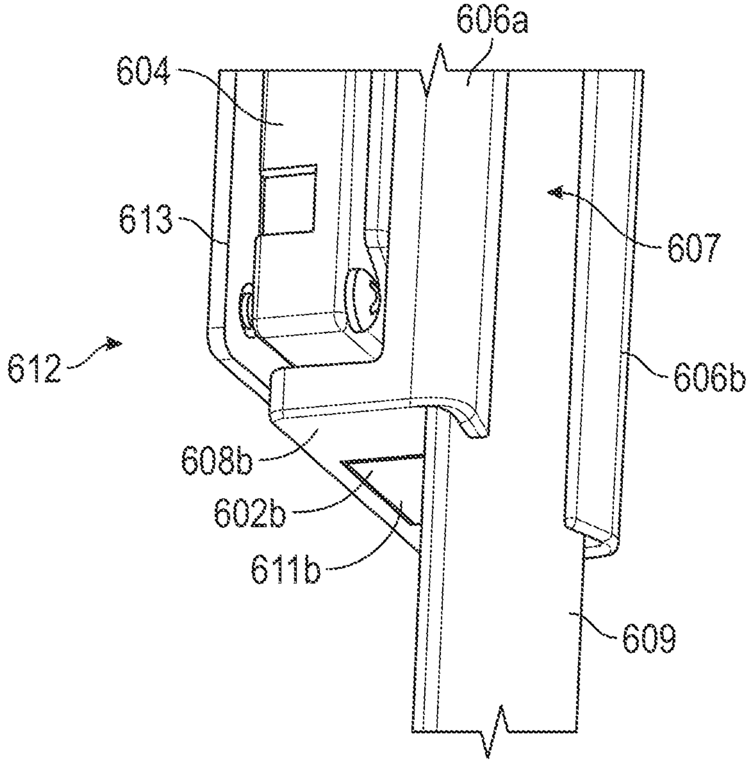

In some embodiments, the sensor and magnet of the spa cover detection system can be located outside the spa cover. The cover detection system can include a magnet holder 606 and a sensor 604. The magnet holder 606 can be secured to a strap 609 of the spa cover. The magnet holder 606 can include a first arm 606*a* and a second arm 606*b*. The first and second arms 606*a*, 606*b* can partially enclose an aperture 607. The aperture 607 can extend an entire length of the magnet holder 606 and can receive at least a portion of the strap 609 thereby allowing the magnet holder 606 to be attached to the strap 609, as shown in FIGS. 11A, 11C, and 11D. In some cases, the magnet holder 606 can include one or more cavities for receiving and securing one or more magnets 602*a*, 602*b*. For example, the magnet holder 606 can define a first cavity 611*a* and a second cavity 611*b*, as shown in FIGS. 11C and 11D respectively. The first and second cavities 611*a*, 611*b* can each receive one of the magnets 602*a*, 602*b*.

The sensor 604 can be mounted to an exterior surface of the spa shell 612, as shown in FIG. 11C-11D. The sensor 604 can be screwed, glued, or otherwise fixed to the exterior surface of the spa shell 612, for example a side surface of the spa shell 612. In some embodiments, a sensor bracket 613 can receive and secure the sensor 604, as shown in FIG. 11B. In some embodiments, the sensor bracket 613 can be made of a galvanized steel, which can include a magnet. The sensor bracket 613 can be powder coated. In some cases, the sensor bracket 613 can include one or more tabs 613*a* which can beneficially allow snap fit of the sensor 604 to the sensor bracket 613. In some cases, the sensor 604 and/or the sensor bracket 613 can include a self-adhesive surface to facilitate temporary or permanent mounting of the sensor 604 and/or the sensor bracket 613 to the spa shell 612.

As shown in FIGS. 11C and 11D, the magnet holder 606 can be secured to the sensor 604 and/or the sensor bracket 613. A spa cover, similar or identical to spa covers 110, 310, 410, and/or 510, can be secured to a spa unit by securing the magnet holder 606 to the sensor 604 and/or the sensor bracket 613. The magnet holder 609 For example, the magnet holder 606 can include a first extension 608*a* and a second extension 608*b* which can be secured to the sensor 604. In some embodiments, the first and second extensions 608*a*, 608*b* can be secured to the sensor bracket 613. The magnets 602*a*, 602*b* can, in some cases, magnetically secure the first and second extensions 608*a* and 608*b* to the sensor 604 and/or the sensor bracket 613. When the magnet holder 606 is attached to the sensor 604 and/or the sensor bracket 613, the sensor 604 can detect the proximity of one or both magnets 602*a*, 602*b*. This can beneficially allow the sensor 604 to determine that the spa cover is properly secured to the spa unit. When the magnet holder 606 is not attached or properly secured to the sensor 604 and/or the sensor bracket 613, the sensor 604 will not detect the proximity of the magnets 602, 602*b*. This can beneficially allow the sensor 604 to determine that the spa cover is not secured to the spa unit.

The sensor 604 can communicate with a wireless controller. The wireless controller can be similar or identical to the wireless controller 120, which is described in relation to FIG. 5. The wireless controller can be configured to communicate with the sensor 604. The wireless controller can also communicate with a remote device (e.g., a cellphone, tablet, smart watch) via cellular, Wi-Fi, or other wireless communication. For example, the wireless controller can include a Bluetooth transceiver for communicating with the sensor 604 and/or a remote device. In some embodiments, the wireless controller may include a cellular transceiver for communicating with the remote device and the cellular transceiver may have Bluetooth capabilities. The state of the spa cover (e.g., open, closed, not properly secured to the spa unit, etc.) as detected by the sensor 604 can be transmitted to remote device directly or via the wireless controller. In some cases, more than one sensor and/or magnet can be used to detect the state of the spa cover.

Figure 12C:
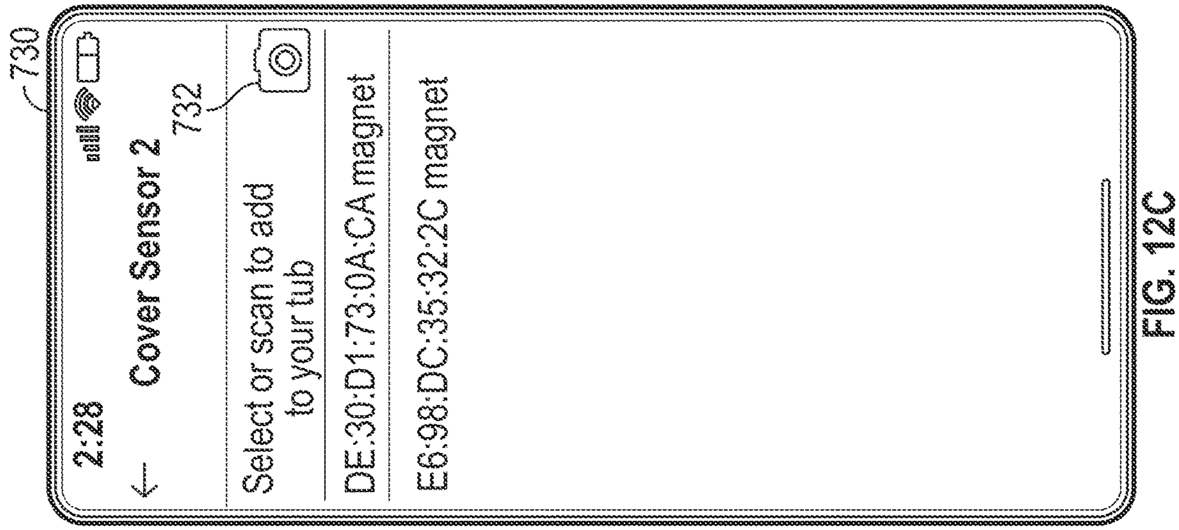
FIGS. 12A-12C illustrate an example of user interface for controlling/monitoring a spa cover detection system.
Figure 12B:
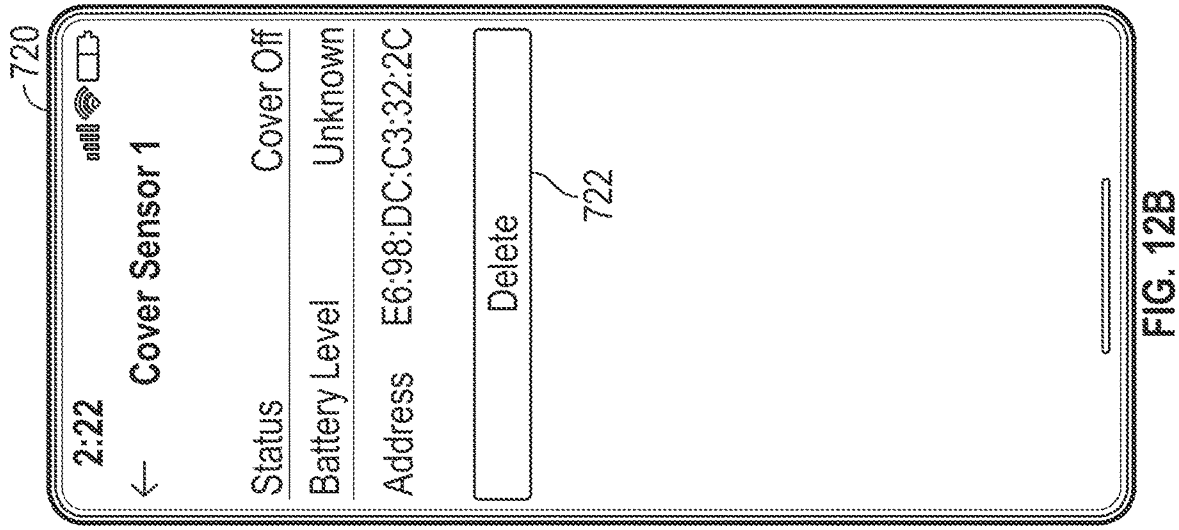
Figure 12A:
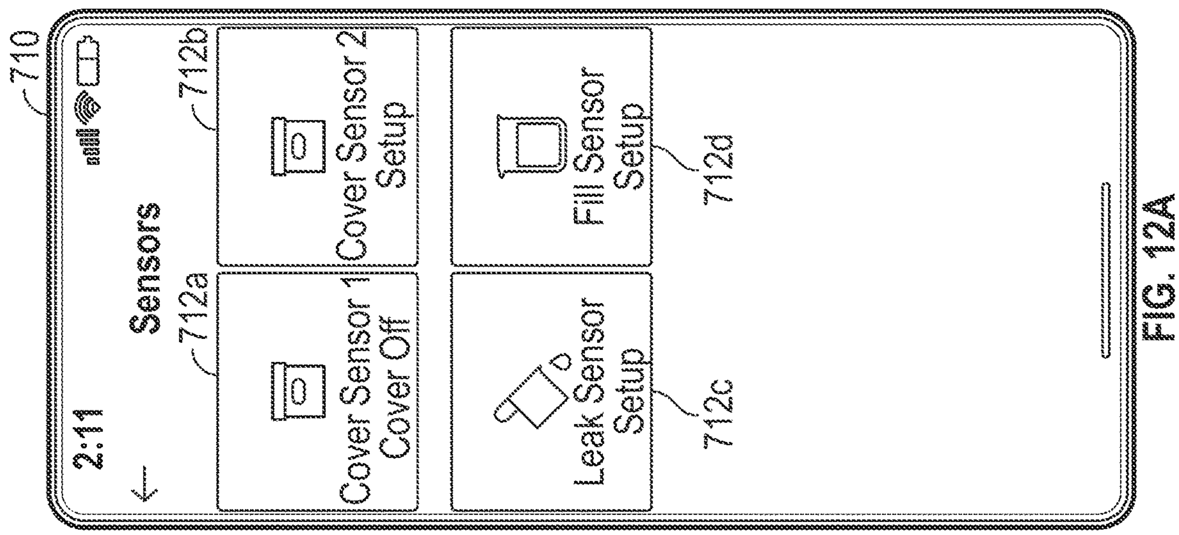

FIGS. 12A-12C show examples of a user interface for controlling and/or monitoring the spa cover detection systems disclosed herein. The user interface can be implemented, for example, using an application on a smartphone or other handheld device. As shown in FIG. 12A, a first user interface 710 can include one or more icons 712*a*-712*d*. The first icon 712*a* can display the status of a first cover sensor (e.g., cover sensor 104, 204, 304, 404, 504, 604). For example, the first icon 712*a* can display a message indicating that, as detected by the first cover sensor, the spa cover is open/off, not properly secured, and/or closed. The first icon 712*a* can also provide a visual indication about the status of the spa cover and/or the first sensor. For example, the first icon 712*a* can display a first color (e.g., green) to provide a first indication about the status of the spa cover and/or the first sensor (e.g., that the first sensor is paired and/or connected, the spa cover is closed, etc.). The first icon 712 can display a second color (e.g., red) to provide a second indication about the status of the spa cover and/or the first sensor (that the first sensor is not paired and/or connected, the spa cover is open, etc.).

Pressing the first icon 712*a* can cause the user interface to transition from the first user interface 710 to a second user interface 720, as shown in FIG. 12B. The second user interface 720 can display information relating to the status of the first sensor including the status of the first spa cover as detected by the first sensor, a battery level of the first sensor, and/or an address of the first sensor (e.g., MAC address). The second user interface 720 can include an icon 722. The icon 722 can be pressed to delete, unpair, and/or forget the first sensor.

The second icon 712*a* can display a message indicating that, as detected by a second cover sensor, the spa cover is open/off, not properly secured, and/or closed. The second icon 712*b* can provide an indication that a second sensor is not connected and/or prompt a user to set up a second sensor. Like the first icon 712*a*, the second icon 712*b* can provide a visual indication about the status of the spa cover and/or the second sensor. For example, the second icon 712*b* can display a first color (e.g., green) to provide a first indication about the status of the spa cover and/or the second sensor (e.g., that the second sensor is paired and/or connected, the spa cover is closed, etc.). The second icon 712*b* can display a second color (e.g., red) to provide a second indication about the status of the spa cover and/or the second sensor (that the second sensor is not paired and/or connected, the spa cover is open, etc.).

Pressing the second icon 712*b* can cause the user interface to transition from the first user interface 710 to a third user interface 730, as shown in FIG. 12C. The third user interface 730 can display an icon 732. Pressing the icon 732 can cause the user interface to transition to a camera mode. In camera mode, a sensor identifier, such as a QR code, associated to a cover sensor can be scanned using the remote device's camera. Scanning the cover sensor's QR code can cause the sensor to connect to the application on the remote device. The third user interface 730 can also display a list of available sensor to connect/pair to.

Although reference is made herein to using the user interface for controlling one or more cover sensors, the user interface can be used to control other sensors and/or displaying information. For example, the user interface can include a third icon 712*c* for controlling/monitoring a spa leak sensor. The user interface can also include a fourth icon 712*d* for controlling/monitoring a spa fill sensor. The third and fourth icons 712*c*, 712*d* can display a message about the status of the status of the sensor they are associated to (e.g., water level, leaks, etc.). Like the first and second icons 712*a*, 712*b* the third and fourth icons 712*c*, 712*d* can provide a visual indication about the status of the sensor they are associated to. In some cases, the user interface can include an icon for displaying information relating to the battery of a sensor (e.g., a cover sensor). For example, the icon can display an indication of remaining battery (e.g., percentage, colors, low battery alerts, etc.), instructions to replace the battery, and/or any other suitable battery indicator.

Although certain embodiments and examples are disclosed herein, inventive subject matter extends beyond the examples in the specifically disclosed embodiments to other alternative embodiments and/or uses, and to modifications and equivalents thereof. While we have described and illustrated in detail embodiments of a cover detection system that includes a first component and a second component, it should be understood that our inventions can be modified in both arrangement and detail. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

Although the cover detection system has been disclosed in the context of certain embodiments and examples, it will be understood by those skilled in the art that the cover detection system and subassemblies extend beyond the specifically disclosed embodiments to other alternative embodiments and/or uses of the embodiments and certain modifications and equivalents thereof. Accordingly, it is intended that the scope of the cover detection system herein-disclosed should not be limited by the particular disclosed embodiments described above but should be determined only by a fair reading of the claims that follow.

What is claimed is:

1. A cover detection system for a spa, the cover detection system comprising:

a spa cover comprising a first panel and a second panel;

a sensor positioned on a first portion of the first panel;

a first component positioned on a first portion of the second panel;

a first bracket configured to be mounted to the first panel; and a second bracket configured to be mounted to the second panel;

wherein when the first panel and the second panel are in a closed position, the sensor and the first component are in a first configuration with respect to each other to indicate a first state; and wherein when the first panel and the second panel are in a folded position, the sensor and the first component are in a second configuration with respect to each other to indicate a second state;

wherein the sensor is configured to be mounted to the first bracket, and wherein the first component is configured to be mounted to the second bracket.

2. The cover detection system of claim 1, wherein the first configuration includes a configuration where the sensor and the first component are in contact with each other.

3. The cover detection system of claim 1, wherein the first configuration includes a configuration where the sensor and the first component are in close proximity to each other.

4. The cover detection system of claim 1, wherein the second configuration includes a configuration where the sensor and the first component are not in contact with each other.

5. The cover detection system of claim 1, wherein the second configuration includes a configuration where the sensor and the first component are not in close proximity to each other.

6. The cover detection system of claim 1, wherein the first bracket comprises one or more tabs configured to nest the first bracket to a corner of the first panel, and wherein the second bracket comprises one or more tabs configured to nest the second bracket to a corner of the second panel.

7. The cover detection system of claim 6, wherein the corner of the first panel and the corner of the second panel abut when the first panel and the second panel are in the closed position.

8. The cover detection system of claim 1, wherein the first and second panels form a fold when the first panel and the second panel are in the closed position, and wherein the sensor and the first component are positioned within the fold when the sensor and the first component are in the first configuration.

9. The cover detection system of claim 1, further comprising a wireless controller in communication with the sensor, the wireless controller configured to receive information from the sensor indicative of a condition of the spa cover, wherein the wireless controller is further configured to provide an indication to a user of whether the spa cover is in the first state or the second state.

10. The cover detection system of claim 1, wherein the first component comprises a magnet.

11. The cover detection system of claim 1, wherein the closed position is when the first and second panels cover an upper end of a spa shell, and the folded position is when at least one of the first and second panels is not covering at least a portion of the upper end of the spa shell.

12. A cover detection system for a spa, the cover detection system comprising:

a sensor;

a magnet;

a first attachment component configured to receive and secure one of the sensor or the magnet; and a second attachment component configured to receive and secure the other of the sensor or the magnet;

wherein the first attachment component is configured to attach to a first spa cover panel of a spa cover;

wherein the second attachment component is configured to attach to a second spa cover panel of the spa cover;

wherein each of the first attachment component and the second attachment component comprises a recess configured to receive either the sensor or the magnet.

13. The cover detection system of claim 12, wherein:

the first attachment component comprises one or more tabs configured to attach the first attachment component to the first spa cover panel; and the second attachment component comprises one or more tabs configured to attach the second attachment component to the second spa cover panel.

14. The cover detection system of claim 12, wherein the first attachment component is configured to nest around the first spa cover panel, and wherein the second attachment component is configured to nest around the second spa cover panel.

15. The cover detection system of claim 12, wherein the first attachment component is configured to attach to a corner of the first spa cover panel, and wherein the second attachment component is configured to attach to a corner of the second spa cover panel.

16. The cover detection system of claim 12, further comprising a wireless controller in communication with the sensor, the wireless controller configured to receive information from the sensor indicative of a condition of the spa cover and configured to provide an indication to a user of the condition of the spa cover.

17. The cover detection system of claim 12, wherein the sensor is configured to detect a position of the magnet relative to the sensor.

18. The cover detection system of claim 12, wherein the position includes a first position where the sensor and the magnet are in contact with each other or in close proximity to each other and a second position where the sensor and the magnet are not in contact with each other or are not in close proximity to each other.

19. The cover detection system of claim 12, wherein each of the first attachment component and the second attachment component comprises a plastic bracket.

20. The cover detection system of claim 12, wherein each recess of the first attachment component and the second attachment component comprises:

a first portion configured to receive the sensor; and a second portion configured to receive the magnet.

* * * * *